Dec. 14, 1948.  N. S. TROUT, JR  2,456,600
VARIABLE SPEED TRANSMISSION
Filed Feb. 4, 1947

WITNESS:
Esther M. Stockton

INVENTOR.
Norwood S. Trout, Jr.
BY
Clinton S. Janes
ATTORNEY

Patented Dec. 14, 1948

2,456,600

UNITED STATES PATENT OFFICE 2,456,600

VARIABLE-SPEED TRANSMISSION

Norwood S. Trout, Jr., Elmira, N. Y., assignor to Bendix Aviation Corporation, Elmira Heights, N. Y., a corporation of Delaware Application February 4, 1947, Serial No. 726,412

8 Claims. (Cl. 74—368)

The present invention relates to a variable speed transmission for washing machines and the like, and more particularly to a transmission arranged to operate selectively at either of two forward speeds or in the reverse direction.

It is an object of the present invention to provide a novel variable speed transmission, which is efficient and reliable in operation while being simple and economical in construction.

It is another object to provide such a device incorporating a low speed forward drive which automatically engages when the transmission is driven forward, a high speed forward drive which, when engaged, causes the low speed drive to overrun, and a driving connection which overruns in a forward direction, but engages automatically when the transmission is rotated backward.

It is another object to provide such a device in which the reverse drive is at the low speed ratio.

It is another object to provide such a device in which the reverse drive incorporates an overrunning clutch and means to prevent the engagement of the overrunning clutch when the transmission is rotating forward at either high or low speed.

Further objects and advantages will be apparent from the following description taken in connection with the accompanying drawing, in which.

Figure 1:
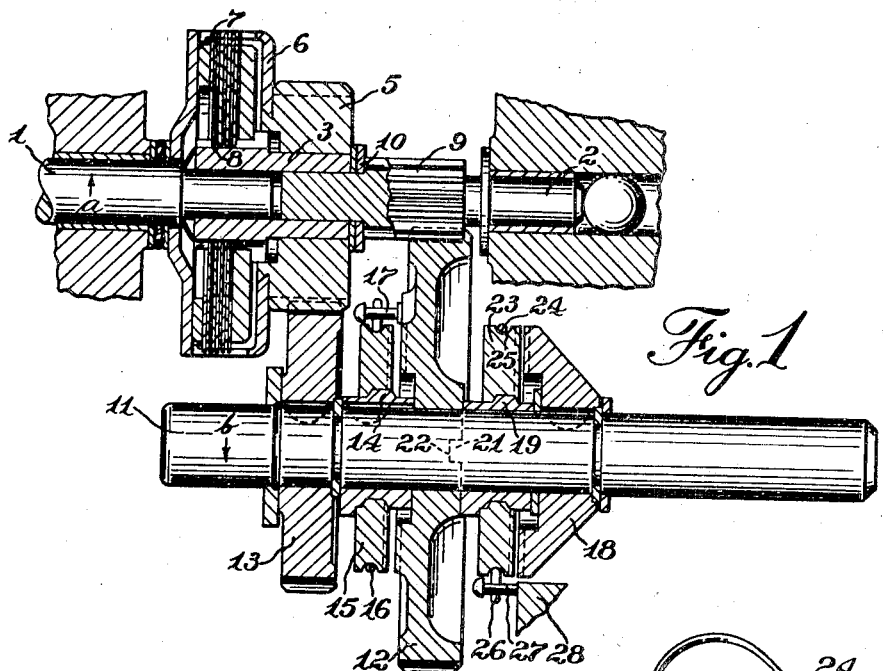
Fig. 1 is a side elevation partly broken away and in section of a transmission constituting a preferred embodiment of the invention.
Figure 3:
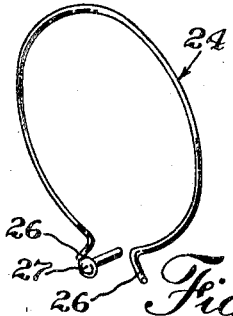
Fig. 3 is a detail in perspective of the drag ring for the reverse drive clutch.

In Fig. 1 there is illustrated a drive shaft 1 to which a stub shaft 2 is slidably coupled by means of a spline sleeve 3. A high speed drive gear 5 is journalled on sleeve 3, and clutch means for connecting the high speed gear to the drive shaft are provided including a housing 6 fixed to the high speed gear and discs 7 and 8 splined alternately to the housing and the coupling sleeve 3. The stub shaft 2 has a low speed drive pinion 9 formed thereon providing a thrust shoulder 10 for applying pressure to the end of the sleeve 3, and means are provided for moving the stub shaft longitudinally to the left in order to compress the clutch discs.

The means for actuating the high speed clutch is more fully disclosed in the Patent 2,172,780 assigned to the assignee of the present application and reference to said disclosure is made for a complete disclosure thereof.

A driven shaft 11 is mounted parallel to the drive shaft 1 and has a driven high speed pinion 13 keyed thereon. A low speed gear 12 is journalled on the driven shaft, and a self-tightening overrunning clutch means is provided for connecting the low speed gear to the driven shaft, comprising a screw shaft 14 keyed to the driven shaft, a clutch plate 15 threaded on the screw shaft, and a friction drag ring 16, bearing on the periphery of the clutch plate and anchored on a pin 17 fixed on the adjacent side of the low speed gear 12.

In addition to the self-tightening clutch connection described for rotating the driven shaft 11 in a forward direction by the low speed gear 12, a second self-tightening connection is provided for rotating the driven shaft backward when the transmission is rotated in a reverse direction. The reverse drive comprises a clutch member 18, fixed on the driven shaft 11, a screw shaft 19 journalled on the driven shaft and rigidly connected to rotate with the driven low speed gear 12 as by means of engaging lugs and recesses 21, 22 respectively, and a driving clutch member 23 threaded on screw shaft 19 for movement into and out of frictional engagement with the driven clutch member 18. A drag ring 24 is seated frictionally in a groove 25 in the periphery of the driving clutch member 23 and has terminal abutments 26 adapted to engage an anchor pin 27 fixed in the housing for the gearing, a fragment of which is illustrated at 28.

It will be understood that the screw shaft 14 is threaded in such a direction that rotation of the clutch plate 15 in a forward direction on the screw shaft will cause said plate to engage the adjacent side of the driven low speed gear 12.

The screw shaft 19 is similarly threaded so that when it is rotated in a reverse direction with respect to the driving clutch member 23, it will move that clutch member into engagement with the driven clutch member 18, and thereby connect the driven low speed gear 12 to the driven shaft 11 during reverse rotation of the transmission.

In the operation of this transmission, as a washing machine drive, low speed operation of the washing machine mechanism is accomplished by rotation of the drive shaft 1 in the direction of the arrow $a$. The rotation of the drive shaft is transmitted through the sleeve 3 to the stub shaft 2 and low speed drive pinion 9 which rotation turns the low speed driven gear 12 in the direction of the arrow $b$. The drag ring 16 is thus rotated by means of pin 17 and threads the clutch plate 15 along the screw shaft 14 into engagement with the low speed gear 12, whereby the driven shaft 11 is connected to rotate with said low speed gear.

During this time, the driving clutch member 23 is retarded slightly by the drag ring 24 whereby is held out of engagement with the driven clutch member 18.

When it is desired to reverse the direction of the driven shaft 11, the driving shaft 1 is rotated reversely by any suitable means such as a reversible electric motor. The backward rotation of the low speed pinion 9 turns the low speed gear backward whereby the clutch plate 15 is backed away from the driven gear 12 by the action of screw shaft 14. At the same time, the reverse driving clutch member 23 is moved by the screw shaft 19 into engagement with the driven clutch member 18, such traversal being insured by the retarding action of the drag ring 24 on the driving clutch member.

Closure of the clutch 18, 23 connects the driven gear 12 to the driven shaft 11 which is accordingly rotated backward by the reverse rotation of the drive shaft 1.

When it is desired to rotate the washing machine mechanism at high speed, the drive shaft 1 is rotated in a forward direction and the high speed clutch 6, 7, 8 is closed by endwise pressure applied from the stub shaft 2 to the high speed drive gear 5. The latter is thereby clutched to the drive shaft 1 and thereby rotates the high speed driven pinion 13 and the driven shaft 11 on which it is mounted at high speed. During this time the low speed forward drive clutch 15, 12 overruns, since the screw shaft 14 is rotating more rapidly than the low speed gear 12, and the drag ring 16 accordingly has a retarding effect on clutch plate 15 which traverses it to the left away from the driven gear 12. The self-tightening clutch 18, 23 also overruns inasmuch as the drag ring 24 retards the driving clutch member 23 causing it to be traversed away from the driven clutch member 18 on the screw shaft 19 which is rotating forwardly at low speed.

It will be understood that the drag ring 16 is preferably applied to clutch plate 15 in such a way that during overrunning, the ring tends to open up and reduce the frictional drag on said clutch plate. When the drag ring 16 is effective to close the clutch, the wrapping-down effect of the drag ring increases its effectiveness in securing closure of the clutch. Since drag ring 24 slips on the clutch member 23 during rotation of the transmission in either direction, it is preferably formed with the abutments 26 for alternatively engaging the anchor pin 27 so that the ring tends to open up in either direction of rotation.

Figure 2:
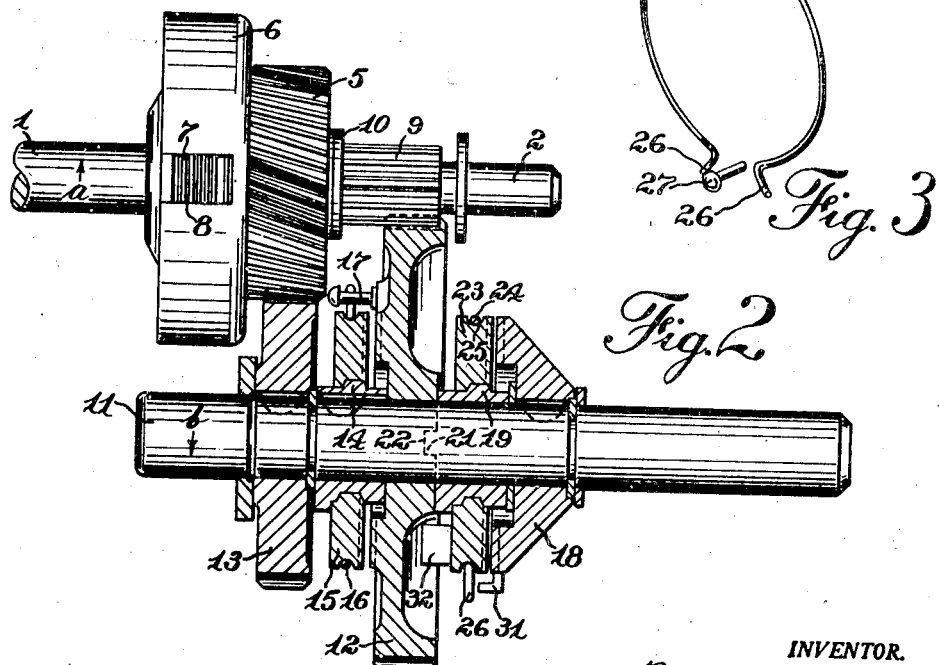
Fig. 2 is a similar view of a second embodiment of the invention.

The transmission illustrated in Fig. 2 is substantially similar to that shown in Fig. 1 except for the means for controlling the reverse drive clutch, and the corresponding parts are similarly numbered. In this embodiment, the drag ring 24 for the reverse drive clutch is not anchored to the casing but a pin 31 is mounted on the driven clutch member 18 in position to engage an abutment 26 of the drag ring 24 when the driving clutch member 23 approaches the driven clutch member 18. In order to control the position of the driving clutch member on the screw shaft 19, a weight member 32 is mounted eccentrically on the driving clutch member which weight member tends to make the clutch member lag behind the rotation of the screw shaft on which it is threaded.

When the screw shaft 19 is rotated forwardly, this tendency of the driving clutch member to lag behind causes the clutch member to be traversed on the screw shaft away from the driven clutch member 18. Upon reverse rotation of the screw shaft, however, the retardation of the driving clutch member by the weight 32 causes the driving clutch member to traverse on the screw shaft into engagement with the driven clutch member 18. Such engagement is preferably assisted by the drag ring 24 which is positioned to engage the pin 31 on the driven clutch member 18 prior to the engagement of the clutch members.

It will be understood that the drag ring 24 may be omitted in the second embodiment of the invention if so desired, although it is preferred to employ the drag ring in order to provide a more positive control of the clutch.

Although but two embodiments of the invention have been shown and described in detail, it will be understood that other embodiments are possible and various changes may be made in the design and arrangement of the parts without departing from the spirit of the invention as defined in the claims appended hereto.

What is claimed is:

1. In a variable speed transmission, a drive shaft arranged to be rotated either forward or backward by a source of power, a high speed gear journalled thereon, a high speed clutch for connecting the high speed gear to rotate with the drive shaft, a low speed pinion connected to rotate with the drive shaft, a driven shaft, a high speed pinion fixed thereon meshing with the high speed gear, a low speed gear journalled on the driven shaft meshing with the low speed pinion, a self-tightening clutch between the low speed gear and driven shaft arranged to transmit forward rotation of the low speed gear to the driven shaft, and means including a reversely acting self-tightening clutch for connecting the low speed gear to rotate the driven shaft when the low speed gear is rotated backward by the drive shaft, both said self-tightening clutches being arranged to overrun freely when the driven shaft is rotating forwardly at high speed by closure of the high speed clutch.

2. A variable speed transmission as set forth in claim 1, said reversely acting self-tightening clutch including means for holding the clutch open while the parts of the clutch are rotating forwardly, said means frictionally initiating engagement of the clutch members on reverse rotation thereof.

3. A variable speed transmission as set forth in claim 1, in which the reversely acting self-tightening clutch includes a driven clutch member fixed on the driven shaft, a screw shaft connected to rotate with the low speed gear, a driving clutch member threaded on the screw shaft for longitudinal movement into and out of engagement with the driven clutch member, and means causing the driving clutch member to thread itself along the screw shaft into engagement with the driven clutch member when the screw shaft rotates backward.

4. A variable speed transmission as set forth in claim 3, in which the last mentioned means includes a non-rotatable member bearing frictionally on the driving clutch member.

5. In a variable speed gear transmission, a driving shaft arranged to be rotated either forward or backward by a source of power, a high speed gear, a normally open clutch adapted when closed to connect the high speed gear to the driving shaft, a low speed pinion connected to rotate with the driving shaft, a driven shaft, a high speed pinion fixed thereon meshing with the high speed gear, a low speed gear rotatably mounted on the driven shaft meshing with the low speed pinion, a self-tightening clutch connecting the low speed gear to the driven shaft for forward rotation and arranged to release and allow the driven shaft to overrun when the driven shaft is rotated forwardly at high speed by closure of the high speed clutch, a second self-tightening clutch for connecting the low speed gear to the driven shaft, and means for holding open the last named clutch while the low speed gear is rotating forwardly, and for closing the same when the low speed gear is rotated backward by the drive shaft.

6. A variable speed transmission as set forth in claim 5, in which the second self-tightening clutch includes a driven clutch member fixed on the driven shaft, a screw shaft connected to rotate with the low speed gear, a driving clutch member threaded on the screw shaft for movement into and out of engagement with the driven clutch member and a non-rotatable drag member bearing frictionally on the driving clutch member.

7. A variable speed transmission as set forth in claim 5, in which said last named means includes a drag member mounted on the driving clutch member and bearing frictionally thereon, and means on the driven clutch member to engage the drag member when the driving clutch member approaches the driven clutch member.

8. A variable speed transmission as set forth in claim 5, in which the second self-tightening clutch includes a driven clutch member fixed on the driven shaft, a screw shaft connected to rotate with the low speed gear, a driving clutch member threaded on the screw shaft for movement into and out of engagement with the driven clutch member and an eccentrically mounted weight member on the driving clutch member.

NORWOOD S. TROUT, Jr.

REFERENCES CITED

The following references are of record in the file of this patent:

UNITED STATES PATENTS

| Number | Name | Date |
|---|---|---|
| 2,178,712 | Whitney | Nov. 7, 1939 |
| 2,378,954 | Swift | June 26, 1945 |

FOREIGN PATENTS

| Number | Country | Date |
|---|---|---|
| 280,561 | Germany | Nov. 21, 1914 |